US009470944B2

(12) United States Patent
Sung et al.

(10) Patent No.: US 9,470,944 B2
(45) Date of Patent: Oct. 18, 2016

(54) LIQUID CRYSTAL DISPLAY HAVING COMMON VOLTAGE COMPENSATOR

(71) Applicant: LG DISPLAY CO., LTD., Seoul (CN)

(72) Inventors: Changyong Sung, Paju-si (KR); Hyunmyoung Yoon, Chilgok-gun (KR); Sunwoo Park, Gwacheon-si (KR); Jonghee Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 56 days.

(21) Appl. No.: 14/458,964

(22) Filed: Aug. 13, 2014

(65) Prior Publication Data
US 2015/0062471 A1 Mar. 5, 2015

(30) Foreign Application Priority Data

Aug. 28, 2013 (KR) ........................ 10-2013-0102528

(51) Int. Cl.
G02F 1/1362 (2006.01)
G09G 3/36 (2006.01)
(52) U.S. Cl.
CPC ....... *G02F 1/136286* (2013.01); *G02F 1/1362* (2013.01); *G09G 3/3655* (2013.01); *G02F 2001/136222* (2013.01); *G09G 2300/0426* (2013.01); *G09G 2320/0223* (2013.01); *G09G 2320/0233* (2013.01)
(58) Field of Classification Search
CPC .................................................. G09G 3/3655
See application file for complete search history.

(56) References Cited

U.S. PATENT DOCUMENTS

| 5,841,410 | A | 11/1998 | Oda et al. |
| 8,552,945 | B2 * | 10/2013 | Lim .................... G09G 3/3655 345/100 |
| 2001/0007413 | A1 | 7/2001 | Battersby |
| 2002/0063703 | A1 | 5/2002 | Furuhashi et al. |
| 2005/0156840 | A1 * | 7/2005 | Kim .................... G09G 3/3655 345/87 |
| 2006/0244704 | A1 | 11/2006 | Jaehun |
| 2007/0002005 | A1 | 1/2007 | Kim et al. |
| 2007/0024565 | A1 | 2/2007 | Choi |
| 2007/0279355 | A1 | 12/2007 | Hirata et al. |
| 2009/0015528 | A1 * | 1/2009 | Sheu .................... G09G 3/3696 345/87 |
| 2012/0162184 | A1 | 6/2012 | Kim et al. |

FOREIGN PATENT DOCUMENTS

| CN | 1854823 A | 11/2006 |
| CN | 1904992 A | 1/2007 |
| CN | 101344657 A | 1/2009 |

* cited by examiner

Primary Examiner — Kwang-Su Yang
(74) Attorney, Agent, or Firm — Birch, Stewart, Kolasch & Birch, LLP

(57) ABSTRACT

An embodiment of the present invention provides a liquid crystal display including a liquid crystal panel having a display area and a non-display area; left and right common voltage lines connected to common voltage lines formed in the display area and located in the non-display area on the left and right sides of the display area; and a common voltage compensator that receives feedback common voltages from the left and right common voltage lines and outputs compensated common voltages based on the feedback common voltages, wherein the common voltage compensator divides the display area into a first display area and a second display area with respect to the center of the liquid crystal panel and performs different compensation to the first display area and the second display area.

5 Claims, 15 Drawing Sheets

LIQUID CRYSTAL DISPLAY HAVING COMMON VOLTAGE COMPENSATOR

This application claims the benefit of Korean Patent Application No. 10-2013-0102528 filed on Aug. 28, 2013, which is incorporated by reference herein in its entirety.

BACKGROUND OF THE INVENTION

1. Field of the Invention

This document relates to a liquid crystal display.

2. Description of the Related Art

As the information technology is developed, the market for display devices used as connection mediums between users and information is growing. Accordingly, the use of flat panel displays (FPDs) such as a liquid crystal display (LCD), an organic light emitting diode (OLED) display, and a plasma display panel (PDP) is increasing. The liquid crystal displays have been widely used because they can implement a high resolution and can achieve both the small-sized screen and the large-sized screen.

The liquid crystal display comprises a transistor substrate, on which thin film transistors, storage capacitors, pixel electrodes, etc. are formed, a color filter substrate on which color filters, black matrixes, etc. are formed, and a liquid crystal layer positioned between the transistor substrate and the color filter substrate. The liquid crystal display adjusts an arrangement direction of the liquid crystal layer by an electric field generated between the pixel electrodes and common electrodes on the transistor substrate or color filter substrate, thereby displaying an image using light coming from a backlight unit.

In the liquid crystal display, the difference between a data voltage supplied from a data driver and a common voltage serving as a reference potential is applied as a voltage for driving the liquid crystals. The common voltage varies with the position of the liquid crystal panel due to the electrical resistance of a wire, capacitor, etc formed on the liquid crystal panel. For this reason, the common voltage becomes one of the voltages having the biggest effect on picture quality across the liquid crystal panel.

To prevent variations in common voltage, a compensation structure was conventionally suggested, which comprises a common voltage generator for generating a common voltage and a compensation circuit and receives a feedback common voltage from common voltage lines on two sides of the liquid crystal panel and compensates the common voltage supplied to the entire liquid crystal panel based on the feedback common voltage. In the conventional compensation structure, however, these variations are compensated for on the two sides of the liquid crystal panel, which makes it difficult to compensate for signal distortions caused by line resistance and coupling and brings about picture quality problems such as horizontal crosstalk that should be overcome.

SUMMARY OF THE INVENTION

The present invention has been made in an effort to provide a liquid crystal display comprising: a liquid crystal panel comprising a display area and a non-display area; left and right common voltage lines connected to common voltage lines formed in the display area and located in the non-display area on the left and right sides of the display area; and a common voltage compensator that receives feedback common voltages from the left and right common voltage lines and outputs compensated common voltages based on the feedback common voltages, wherein the common voltage compensator divides the display area into a first display area and a second display area with respect to the center of the liquid crystal panel and performs different compensation to the first display area and the second display area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Hereinafter, concrete exemplary embodiments of the present invention will be described in detail with reference to the accompanying drawings.

<First Exemplary Embodiment>

Figure 1:
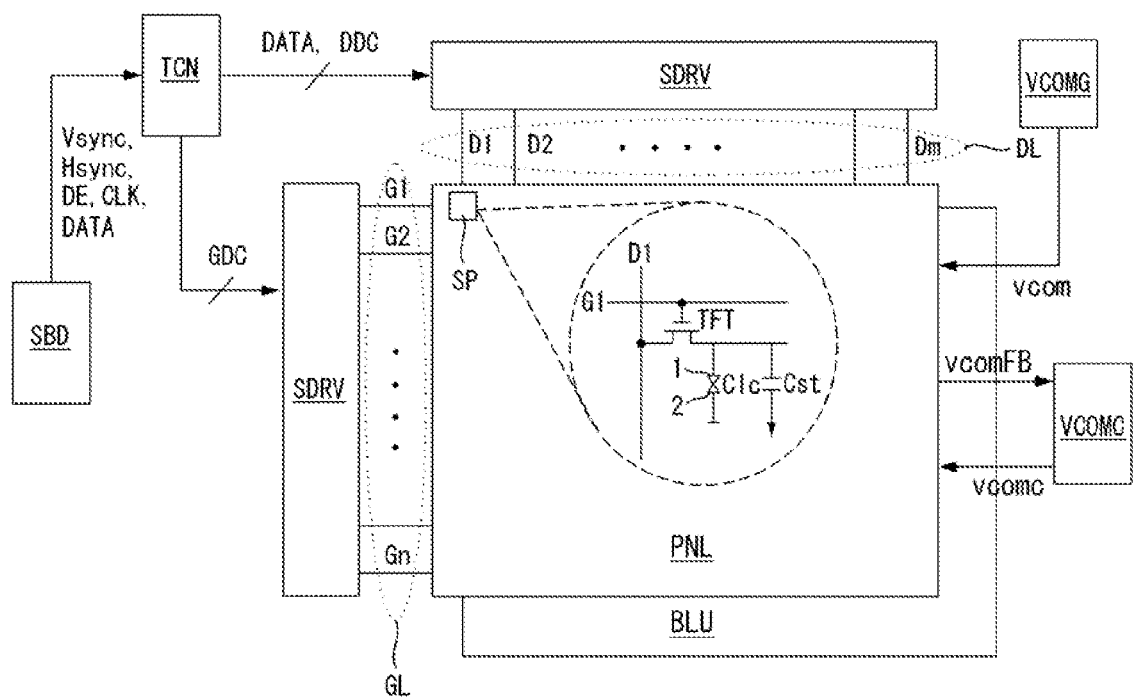
FIG. 1 is a block diagram of a liquid crystal display according to a first embodiment of the present invention.
Figure 2:
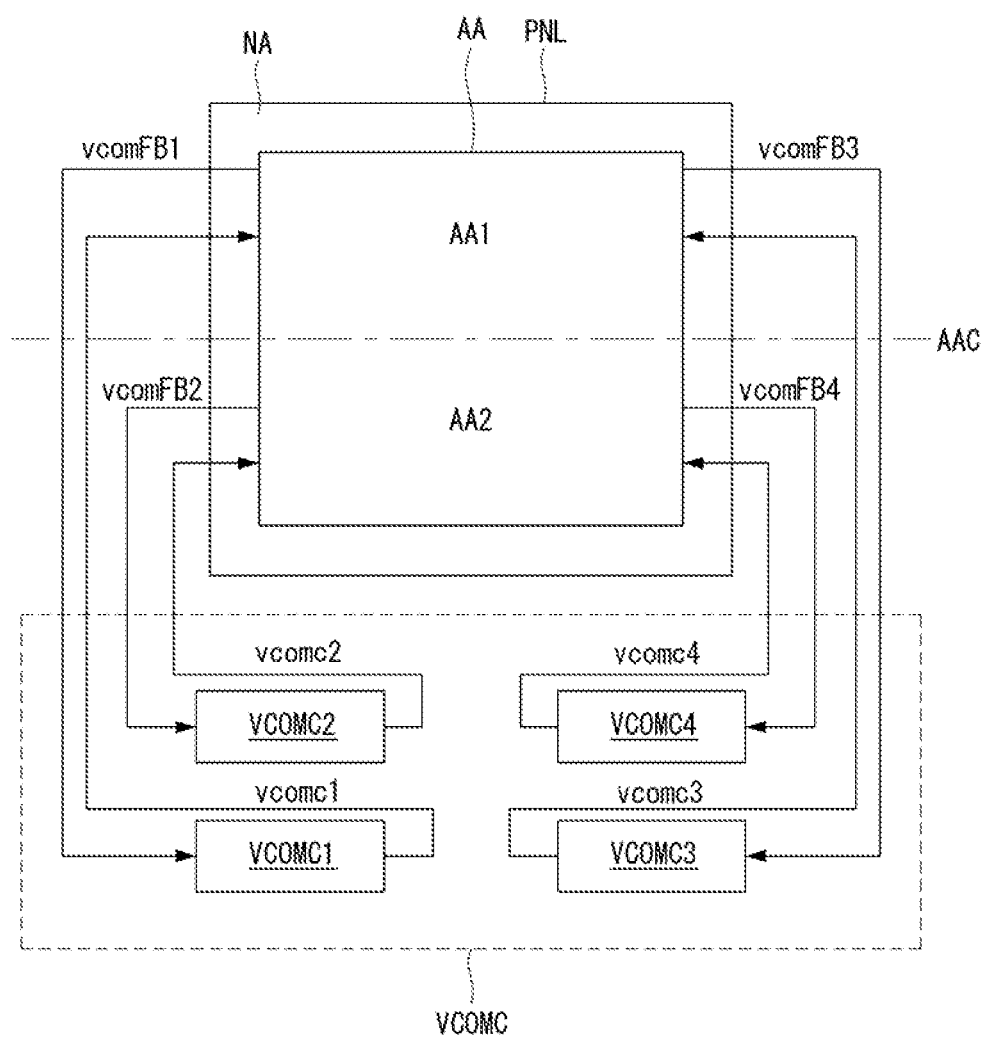
FIG. 2 is a view for explaining the concept of compensation by a common voltage compensator according to the first embodiment of the present invention.

FIG. 1 is a block diagram of a liquid crystal display according to a first exemplary embodiment of the present invention. FIG. 2 is a view for explaining the concept of compensation by a common voltage compensator according to the first exemplary embodiment of the present invention.

As shown in FIG. 1, the liquid crystal display according to the first exemplary embodiment of the present invention comprises a timing controller TCN, a liquid crystal panel PNL, a gate driver GDRV, a data driver SDRV, a backlight unit BLU, a common voltage generator VCOMG, and a common voltage compensator VCOMC. All the components of the liquid crystal display in all embodiments of the invention are operatively coupled and configured.

The timing controller TCN receives a vertical synchronization signal Vsync, a horizontal synchronization signal Hsync, a data enable signal DE, a clock signal CLK, and a data signal DATA from an external source. The timing controller TCN controls the data driver SDRV and the gate driver GDRV by using timing signals such as the vertical synchronization signal Vsync, horizontal synchronization signal Hsync, data enable signal DE, and clock signal CLK, received from the external source. The timing controller TCN may determine a frame period by counting the data enable signal DE of one horizontal period, and thus the vertical sync signal Vsync and the horizontal sync signal Hsync received from the external source may be omitted. Control signals generated by the timing controller TCN comprise a gate timing control signal GDC for controlling the operation timing of the gate driver GDRV and a data timing control signal DDC for controlling the operation timing of the data driver SDRV.

The liquid crystal panel PNL comprises a liquid crystal layer located between a thin film transistor (hereinafter, abbreviated as 'TFT substrate') and a color filter substrate and subpixels SP arranged in a matrix. Data lines DL, gate lines GL, TFTs, storage capacitors, etc are formed on the TFT substrate, and a black matrix, color filters, etc are formed on the color filter substrate. A subpixel SP is defined by a data line DL1 and a gate line GL1 which cross each other. The subpixel SP comprises a TFT driven by a gate signal supplied through the gate line SL1, a storage capacitor Cst for storing a data signal supplied through the data line DL1 as a data voltage, and a liquid crystal cell Clc driven by the data voltage stored in the storage capacitor Cst. The liquid crystal cell Clc is driven by the data voltage supplied to a pixel electrode 1 and a common voltage vcom supplied to a common electrode 2. The common electrode 2 is formed on the color filter substrate in a vertical field driving mode such as a Twisted Nematic (TN) mode and a Vertical Alignment (VA) mode. The common electrode 2 and the pixel electrode 1 are formed on the TFT substrate in a horizontal field driving mode such as an In Plane Switching (IPS) mode and a Fringe Field Switching (FFS) mode. The common electrode receives the common voltage vcom from common voltage lines. A polarizer is attached to the TFT substrate and color filter substrate of the liquid crystal panel PNL, and an alignment layer for setting a pre-tilt angle of liquid crystal is formed thereon. A liquid crystal mode of the liquid crystal panel PNL can be formed by any liquid crystal mode as well as the above-mentioned TN mode, VA mode, IPS mode, and FFS mode.

In response to the gate timing control signal GDC supplied from the timing controller TCN, the gate driver GDRV sequentially generates gate signals while shifting the levels of the signals with a swing width of a gate driving voltage with which the TFTs of the subpixels SP included in the liquid crystal panel PNL can operate. The gate driver GDRV supplies the generated gate signals through the gate lines GL to the subpixels SP included in the liquid crystal panel PNL. The gate driver GDRV may be mounted in the form of IC (integrated circuit) on the liquid crystal panel PNL or a flexible circuit board, or formed in the form of GIP (gate in panel) on the liquid crystal panel PNL.

In response to the data timing control signal DDC supplied from the timing controller TCN, the data driver SDRV samples the data signal DATA supplied from the timing controller TCN and latches the same to convert it into data of a parallel data system. The data driver SDRV converts the digital data signal DATA into an analog signal according to a gamma reference voltage. The data driver SDRV supplies the converted data signal DATA to the subpixels SP of the liquid crystal panel PNL through the data lines DL. The data driver SDRV may be formed in the form of IC on the liquid crystal panel PNL or a flexible circuit board.

The backlight unit BLU provides light to the liquid crystal panel PNL. The backlight unit BLU comprises a light source for emitting light, a light guide plate for guiding light to the liquid crystal panel PNL, and an optical sheet for focusing and diffusing light.

The common voltage generator VCOMG converts external input power into DC power to generate and output the common voltage vcom. The common voltage vcom output from the common voltage generator VCOMG is supplied to the common voltage lines formed on the liquid crystal panel PNL.

The common voltage compensator VCOMC compensates the common voltage vcom supplied to the liquid crystal panel PNL. The common voltage compensator VCOMC compensates the common voltage vcom considering that the amount of ripple depends on the position in the liquid crystal panel PNL. To this end, the common voltage compensator VCOMC receives a feedback common voltage from the common voltage lines formed on the liquid crystal panel PNL, and outputs a compensated common voltage vcomc based on the feedback common voltage vcomFB.

As shown in FIG. 2, the common voltage compensator VCOMC according to the first exemplary embodiment of the present invention receives a feedback common voltage from the common voltage lines formed on both the left and right sides of the liquid crystal panel. The common voltage compensator VCOMC outputs first to fourth compensated common voltages vcomc1 to vcomc4 based on first to fourth feedback common voltages vcomFB1 to vcomFB4. The first to fourth compensated common voltages vcomc1 to vcomc4 output from the common voltage compensator VCOMC are re-supplied to the common voltage lines formed on both the left and right sides of the liquid crystal panel PNL.

Specifically, a display area AA is divided into a first display area AA1 and a second display area AA2 with respect to the center AAC of the liquid crystal panel PNL. A first common voltage compensator VCOMC1 receives a first feedback common voltage vcomFB1 from the left side of the first display area AA1, and supplies a first compensated common voltage vcomc1 to the left side of the first display area AA1. A second common voltage compensator VCOMC2 receives a second feedback common voltage vcomFB2 from the left side of the second display area AA2, and supplies a second compensated common voltage vcomc2 to the left side of the second display area AA2. A third common voltage compensator VCOMC3 receives a third feedback common voltage vcomFB3 from the right side of the first display area AA1, and supplies a third compensated common voltage vcomc3 to the right side of the first display area AA1. A fourth common voltage compensator VCOMC4 receives a fourth feedback common voltage vcomFB4 from the right side of the second display area AA2, and supplies a fourth compensated common voltage vcomc4 to the right side of the second display area AA2.

By dividing the display area AA into the first display area AA1 and the second display area AA2 with respect to the center AAC of the liquid crystal panel PNL and compensating the common voltage vcom fully considering that the amount of ripple depends on the position in the liquid crystal panel PNL, thereby enabling more uniform and accurate compensation of the common voltage vcom.

In the first exemplary embodiment of the present invention, the pattern of the common voltage lines is formed as follows in order to compensate the common voltage fully considering that the amount of ripple depends on the size of the liquid crystal panel PNL.

Figure 3:
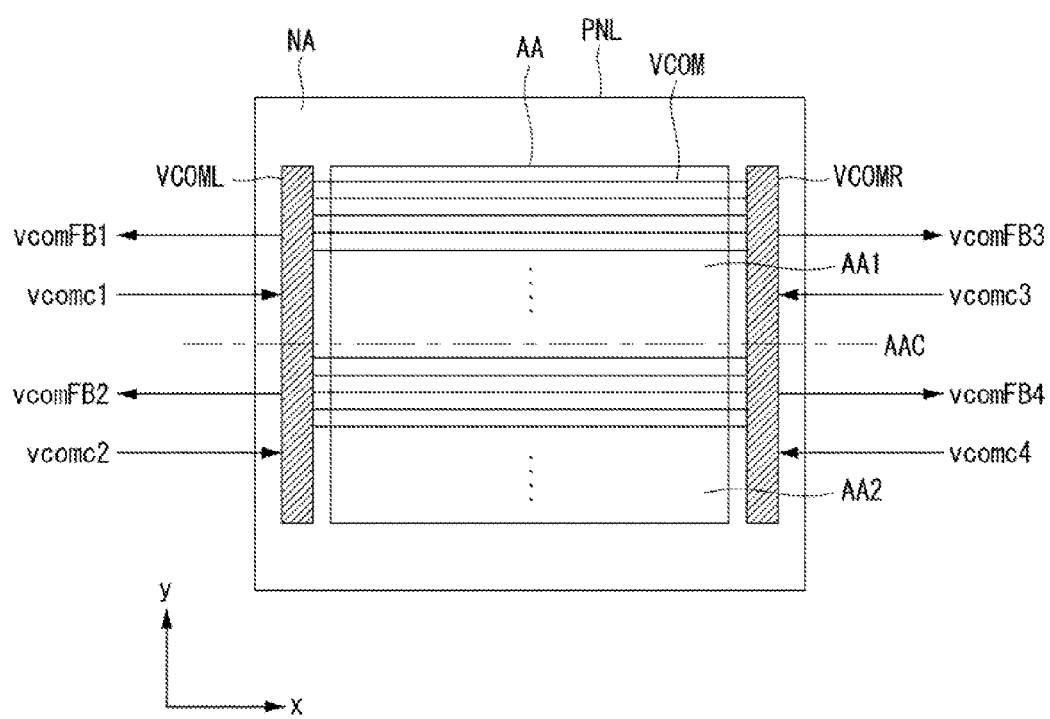
FIG. 3 is a first illustration showing the pattern of common voltage lines for common voltage compensation according to an example of the present invention.

FIG. 3 is a first illustration showing the pattern of common voltage lines for common voltage compensation.

As shown in FIGS. 2 and 3, a display area AA where an image is displayed and a non-display area AA where no image is displayed are defined on the liquid crystal panel PNL. Common voltage lines VCOML and VCOMR are formed on the left and right sides of the display area AA. The illustrated pattern of the common voltage lines VCOML and VCOMR is available in a small-sized liquid crystal display panel PNL.

The left common voltage line VCOML is formed in the non-display area NA on the left side of the display area AA. The right common voltage line VCOMR is formed in the non-display area NA on the right side of the display area AA. The common voltage lines electrically connected to the left common voltage line VCOML and the right common voltage line VCOMR are formed in the display area AA. The common voltage lines VCOM are formed for every gate line.

The left common voltage line VCOML and the right common voltage line VCOMR are formed in the y-axis direction, corresponding to the length of the display area AA. The left common voltage line VCOML and the right common voltage line VCOMR are wider than the common voltage lines VCOM formed in the display area AA. The left common voltage line VCOML and the right common voltage line VCOMR are of equal line width in all areas, and have a rectangular shape. The left common voltage line VCOML and the right common voltage line VCOMR help to minimize a voltage drop or signal distortion caused by line resistance when transferring a common voltage to the common voltage lines VCOM formed in the display area AA.

The first common voltage compensator VCOMC1 receives a first feedback common voltage vcomFB1 from the left common voltage line VCOML formed in the non-display area NA on the left side of the first display area AA1, and supplies a first compensated common voltage vcomc1 to the left common voltage line VCOML formed in the non-display area NA on the left side of the first display area AA1. The second common voltage compensator VCOMC2 receives a second feedback common voltage vcomFB2 from the left common voltage line VCOML formed in the non-display area NA on the left side of the second display area AA2, and supplies a second compensated common voltage vcomc2 to the left common voltage line VCOML formed in the non-display area NA on the left side of the second display area AA2.

The third common voltage compensator VCOMC3 receives a third feedback common voltage vcomFB3 from the right common voltage line VCOMR formed in the non-display area NA on the right side of the first display area AA1, and supplies a third compensated common voltage vcomc3 to the right common voltage line VCOMR formed in the non-display area NA on the right side of the first display area AA1. The fourth common voltage compensator VCOMC4 receives a fourth feedback common voltage vcomFB4 from the right common voltage line VCOMR formed in the non-display area NA on the right side of the second display area AA2, and supplies a fourth compensated common voltage vcomc4 to the right common voltage line VCOMR formed in the non-display area NA on the right side of the second display area AA2.

Figure 4:
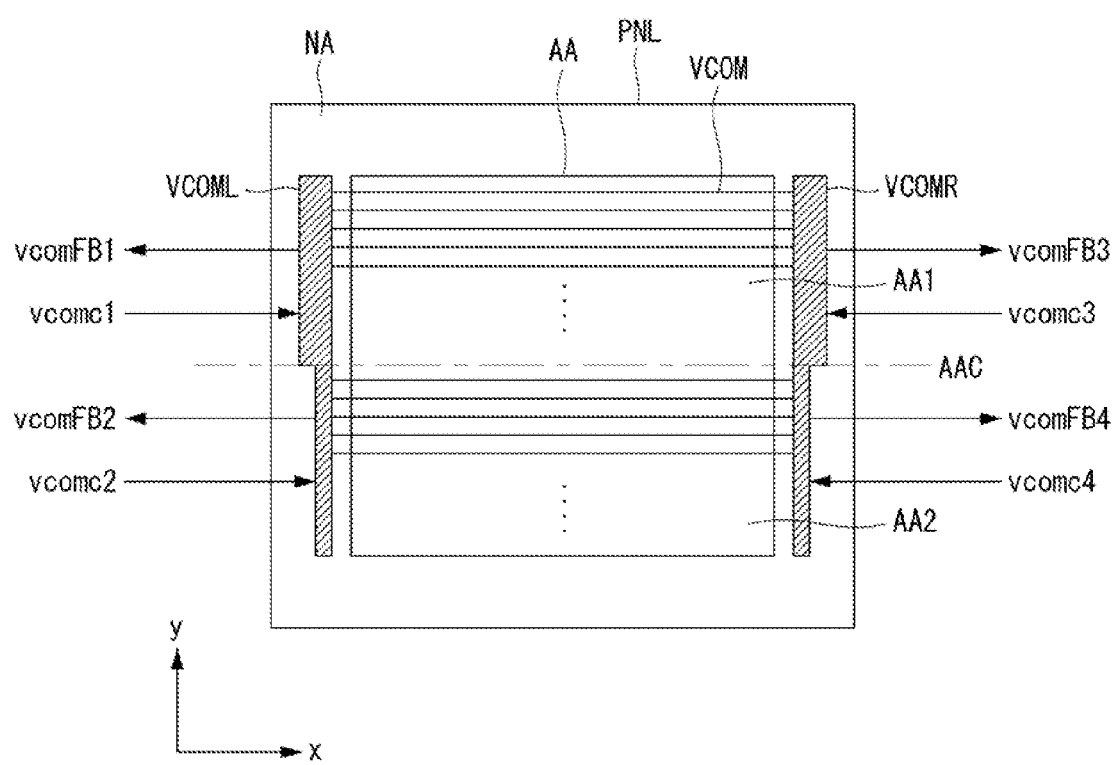
FIG. 4 is a second illustration showing the pattern of common voltage lines for common voltage compensation accordingly to an example of the present invention.

FIG. 4 is a second illustration showing the pattern of common voltage lines for common voltage compensation.

As shown in FIGS. 2 and 4, a display area AA where an image is displayed and a non-display area AA where no image is displayed are defined on the liquid crystal panel PNL. Common voltage lines VCOML and VCOMR are formed on the left and right sides of the display area AA. The illustrated pattern of the common voltage lines VCOML and VCOMR is available in a small-to-medium sized liquid crystal display panel PNL.

The left common voltage line VCOML is formed in the non-display area NA on the left side of the display area AA. The right common voltage line VCOMR is formed in the non-display area NA on the right side of the display area AA. The common voltage lines electrically connected to the left common voltage line VCOML and the right common voltage line VCOMR are formed in the display area AA. The common voltage lines VCOM are formed for every gate line.

The left common voltage line VCOML and the right common voltage line VCOMR are formed in the y-axis direction, corresponding to the length of the display area AA. The left common voltage line VCOML and the right common voltage line VCOMR are wider than the common voltage lines VCOM formed in the display area AA. The left common voltage line VCOML and the right common voltage line VCOMR have a rectangular shape. By the way, the left common voltage line VCOML and the right common voltage line VCOMR formed in the non-display area NA are wider on the left and right sides of the first display area AA1 than on the left and right sides of the second display area AA2. The left common voltage line VCOML and the right common voltage line VCOMR help to minimize a voltage drop or signal distortion caused by line resistance when transferring a common voltage to the common voltage lines VCOM formed in the display area AA. The reason why the line width of the left common voltage line VCOML and the right common voltage line VCOMR varies is because the line resistance in the upper area corresponding to the first display area AA1 is greater than the line resistance in the lower area corresponding to the second area AA2. In other words, the line resistance increases towards the upper area, which is far from the input terminal, because the common voltage is input through the lower area and transferred to the upper area, which is taken into account.

The first common voltage compensator VCOMC1 receives a first feedback common voltage vcomFB1 from the left common voltage line VCOML formed in the non-display area NA on the left side of the first display area AA1, and supplies a first compensated common voltage vcomc1 to the left common voltage line VCOML formed in the non-display area NA on the left side of the first display area AA1. The second common voltage compensator VCOMC2 receives a second feedback common voltage vcomFB2 from the left common voltage line VCOML formed in the non-display area NA on the left side of the second display area AA2, and supplies a second compensated common voltage vcomc2 to the left common voltage line VCOML formed in the non-display area NA on the left side of the second display area AA2.

The third common voltage compensator VCOMC3 receives a third feedback common voltage vcomFB3 from the right common voltage line VCOMR formed in the non-display area NA on the right side of the first display area AA1, and supplies a third compensated common voltage vcomc3 to the right common voltage line VCOMR formed in the non-display area NA on the right side of the first display area AA1. The fourth common voltage compensator VCOMC4 receives a fourth feedback common voltage vcomFB4 from the right common voltage line VCOMR formed in the non-display area NA on the right side of the second display area AA2, and supplies a fourth compensated common voltage vcomc4 to the right common voltage line VCOMR formed in the non-display area NA on the right side of the second display area AA2.

Figure 5:
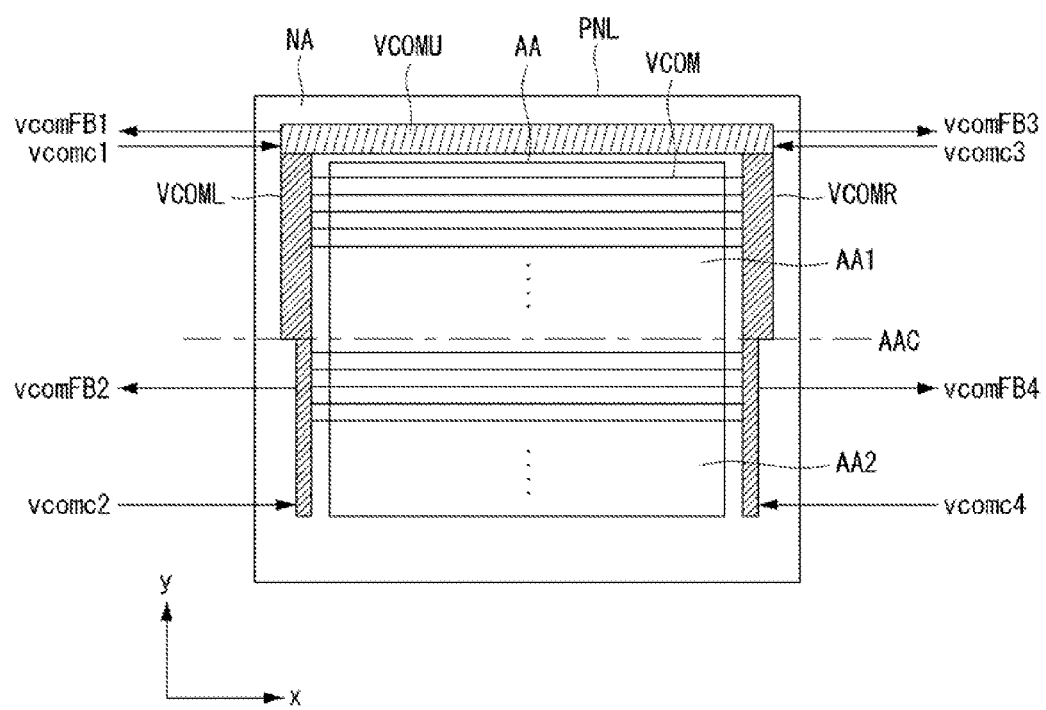
FIG. 5 is a third illustration showing the pattern of common voltage lines for common voltage compensation according to an example of the present invention.

FIG. 5 is a third illustration showing the pattern of common voltage lines for common voltage compensation.

As shown in FIGS. 2 and 5, a display area AA where an image is displayed and a non-display area AA where no image is displayed are defined on the liquid crystal panel PNL. Common voltage lines VCOMU, VCOML, and VCOMR are formed on the left and right sides of the display area AA. The illustrated pattern of the common voltage lines VCOML and VCOMR is available in a medium-to-large sized liquid crystal display panel PNL.

A unilateral common voltage line VCOMU is formed in the non-display area NA on one side (e.g., upper side) of the display area AA. The left common voltage line VCOML is formed in the non-display area NA on the left side of the display area AA. The right common voltage line VCOMR is formed in the non-display area NA on the right side of the display area AA. The unilateral common voltage line VCOMU, the left common voltage line VCOML, and the right common voltage line VCOMR are electrically connected. The common voltage lines electrically connected to the left common voltage line VCOML and the right common voltage line VCOMR are formed in the display area AA. The common voltage lines VCOM are formed for every gate line.

The unilateral common voltage line VCOMU is formed in the x-axis direction, corresponding to the length (or width) of the display area AA. The left common voltage line VCOML and the right common voltage line VCOMR are formed in the y-axis direction, corresponding to the length of the display area AA. The unilateral common voltage line VCOMU, the left common voltage line VCOML, and the right common voltage line VCOMR are wider than the common voltage lines VCOM formed in the display area AA. The unilateral common voltage line VCOMU, the left common voltage line VCOML, and the right common voltage line VCOMR have a rectangular shape. By the way, the left common voltage line VCOML and the right common voltage line VCOMR formed in the non-display area NA are wider on the left and right sides of the first display area AA1 than on the left and right sides of the second display area AA2. The left common voltage line VCOML and the right common voltage line VCOMR help to minimize a voltage drop or signal distortion caused by line resistance when transferring a common voltage to the common voltage lines VCOM formed in the display area AA. The reason why the line width of the left common voltage line VCOML and the right common voltage line VCOMR varies is because the line resistance in the upper area corresponding to the first display area AA1 is greater than the line resistance in the lower area corresponding to the second area AA2. In other words, the line resistance increases towards the upper area, which is far from the input terminal, because the common voltage is input through the lower area and transferred to the upper area, which is taken into account.

The first common voltage compensator VCOMC1 receives a first feedback common voltage vcomFB1 from the unilateral common voltage line VCOMU formed in the non-display area NA on the upper side of the first display area AA1, and supplies a first compensated common voltage vcomc1 to the unilateral common voltage line VCOMU formed in the non-display area NA on the upper side of the first display area AA1. The second common voltage compensator VCOMC2 receives a second feedback common voltage vcomFB2 from the left common voltage line VCOML formed in the non-display area NA on the left side of the second display area AA2, and supplies a second compensated common voltage vcomc2 to the left common voltage line VCOML formed in the non-display area NA on the left side of the second display area AA2.

The third common voltage compensator VCOMC3 receives a third feedback common voltage vcomFB3 from the unilateral common voltage line VCOMU formed in the non-display area NA on the upper side of the first display area AA1, and supplies a third compensated voltage vcomc3 to the unilateral common voltage line VCOMU formed in the non-display area NA on the upper side of the first display area AA1. The fourth common voltage compensator VCOMC4 receives a fourth feedback common voltage vcomFB4 from the right common voltage line VCOMR formed in the non-display area NA on the right side of the second display area AA2, and supplies a fourth compensated common voltage vcomc4 to the right common voltage line VCOMR formed in the non-display area NA on the right side of the second display area AA2.

Figure 6:
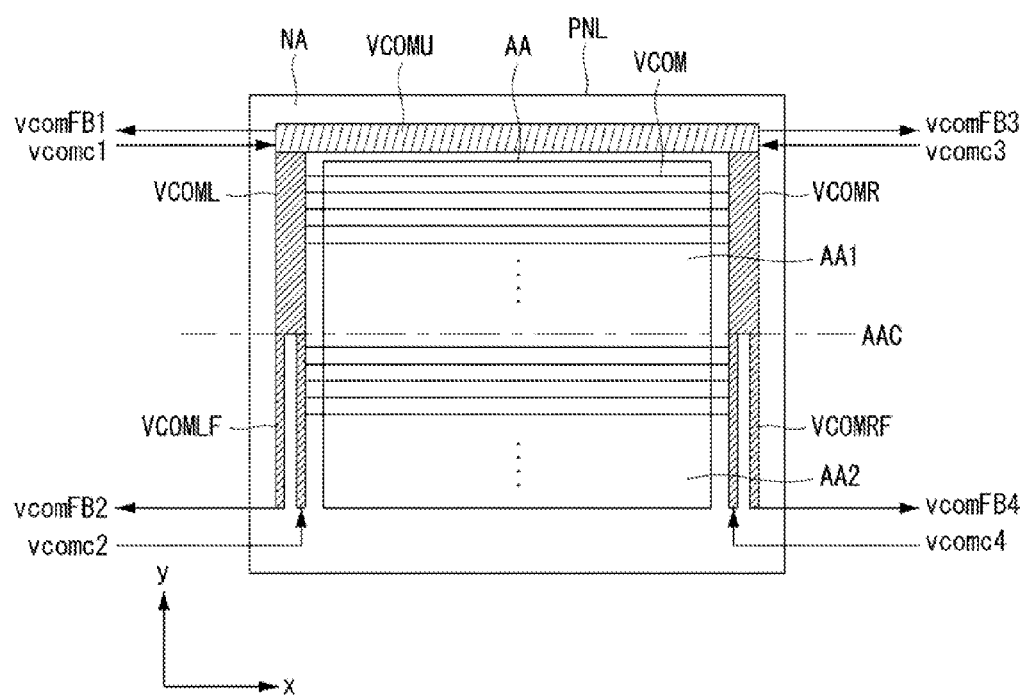
FIG. 6 is a fourth illustration showing the pattern of common voltage lines for common voltage compensation according to an example of the present invention.

FIG. 6 is a fourth illustration showing the pattern of common voltage lines for common voltage compensation.

As shown in FIGS. 2 and 6, a display area AA where an image is displayed and a non-display area AA where no image is displayed are defined on the liquid crystal panel PNL. Common voltage lines VCOMU, VCOML, and VCOMR and dummy common voltage lines VCOMLF and VCOMRF are formed on the left and right sides of the display area AA. The illustrated pattern of the common voltage lines VCOML and VCOMR is available in a large sized liquid crystal display panel PNL.

A unilateral common voltage line VCOMU is formed in the non-display area NA on one side (e.g., upper side) of the display area AA. The left common voltage line VCOML is formed in the non-display area NA on the left side of the display area AA. The left dummy common voltage line VCOMLF is formed in the non-display area NA on the left side of the display area AA, and connected to the left common voltage line VCOML. The right common voltage line VCOMR is formed in the non-display area NA on the right side of the display area AA. The right dummy common voltage line VCOMRF is formed in the non-display area NA on the right side of the display area AA, and connected to the right common voltage line VCOMR. The unilateral common voltage line VCOMU, the left common voltage line VCOML, and the right common voltage line VCOMR are electrically connected. The common voltage lines electrically connected to the left common voltage line VCOML and the right common voltage line VCOMR are formed in the display area AA. The common voltage lines VCOM are formed for every gate line.

The unilateral common voltage line VCOMU is formed in the x-axis direction, corresponding to the length (or width) of the display area AA. The left common voltage line VCOML and the right common voltage line VCOMR are formed in the y-axis direction, corresponding to the length of the display area AA. The left dummy common voltage line VCOMLF and the right dummy common voltage line VCOMRF are formed in the y-axis direction, partially corresponding to the length of the display area AA. The unilateral common voltage line VCOMU, the left common voltage line VCOML, the right common voltage line VCOMR, the left dummy common voltage line VCOMLF, and the right dummy common voltage line VCOMRF are wider than the common voltage lines VCOM formed in the display area AA.

The unilateral common voltage line VCOMU, the left common voltage line VCOML, the right common voltage line VCOMR, the left dummy common voltage line VCOMLF, and the right dummy common voltage line VCOMRF have a rectangular shape. By the way, the left common voltage line VCOML and the right common voltage line VCOMR formed in the non-display area NA are wider on the left and right sides of the first display area AA1 than on the left and right sides of the second display area AA2.

The left common voltage line VCOML and the right common voltage line VCOMR help to minimize a voltage drop or signal distortion caused by line resistance when transferring a common voltage to the common voltage lines VCOM formed in the display area AA. The reason why the line width of the left common voltage line VCOML and the right common voltage line VCOMR varies is because the line resistance in the upper area corresponding to the first display area AA1 is greater than the line resistance in the lower area corresponding to the second area AA2. In other words, the line resistance increases towards the upper area, which is far from the input terminal, because the common voltage is input through the lower area and transferred to the upper area, which is taken into account. Also, the left dummy common voltage line VCOMLF and the right dummy common voltage line VCOMRF each are physically separated from compensated common voltage supply parts so that the common voltage fed back from the left and right common voltage lines VCOML and VCOMR at the center AAC of the liquid crystal panel PNL acts as a representative voltage. To this end, the left dummy common voltage line VCOMLF and the right dummy common voltage line VCOMRF are physically isolated from the left and right common voltage lines VCOML and VCOMR in the non-display area NA on the left and right sides of the second display area AA2.

The first common voltage compensator VCOMC1 receives a first feedback common voltage vcomFB1 from the unilateral common voltage line VCOMU formed in the non-display area NA on the upper side of the first display area AA1, and supplies a first compensated common voltage vcomc1 to the unilateral common voltage line VCOMU formed in the non-display area NA on the upper side of the first display area AA1. The second common voltage compensator VCOMC2 receives a second feedback common voltage vcomFB2 from the left common voltage line VCOML formed in the non-display area NA on the left side of the second display area AA2, and supplies a second compensated common voltage vcomc2 to the left common voltage line VCOML formed in the non-display area NA on the left side of the second display area AA2.

The third common voltage compensator VCOMC3 receives a third feedback common voltage vcomFB3 from the unilateral common voltage line VCOMU formed in the non-display area NA on the upper side of the first display area AA1, and supplies a third compensated common voltage vcomc3 to the unilateral common voltage line VCOMU formed in the non-display area NA on the upper side of the first display area AA1. The fourth common voltage compensator VCOMC4 receives a fourth feedback common voltage vcomFB4 from the right common voltage line VCOMR formed in the non-display area NA on the right side of the second display area AA2, and supplies a fourth compensated common voltage vcomc4 to the right common voltage line VCOMR formed in the non-display area NA on the right side of the second display area AA2.

Figure 7:
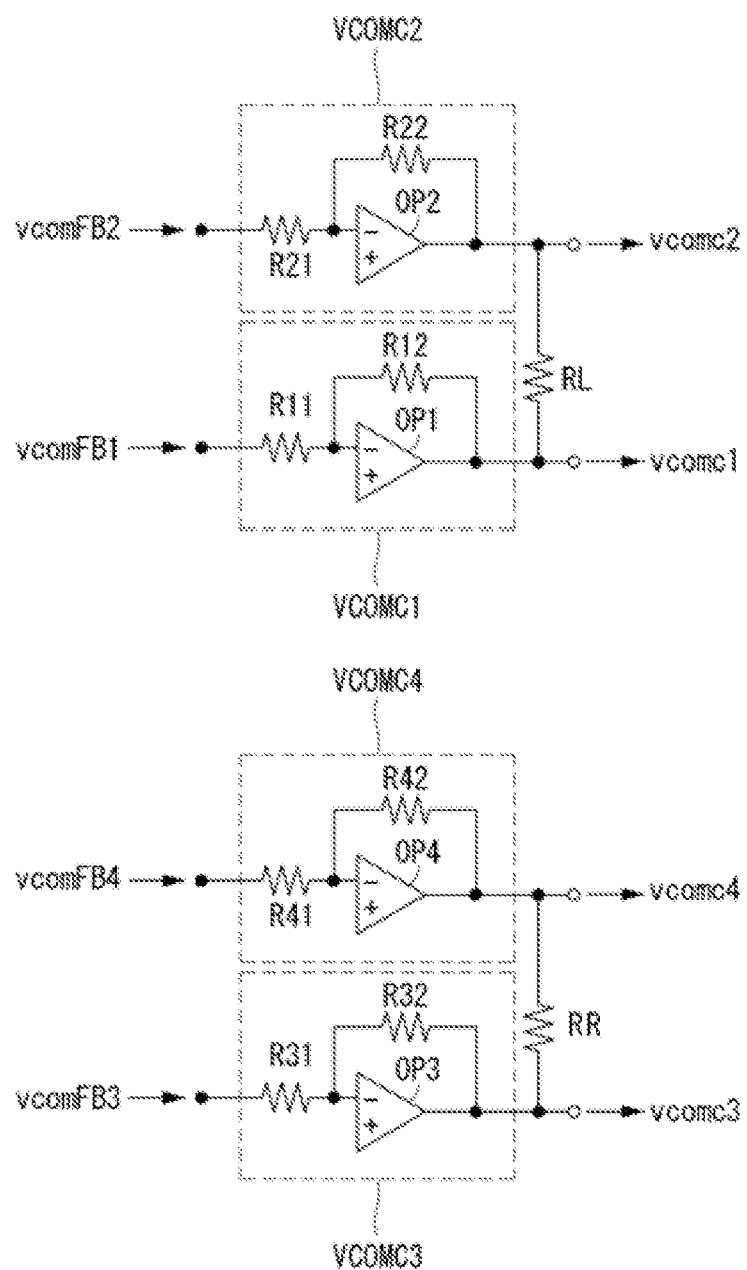
FIG. 7 is a circuit configuration diagram illustrating the common voltage compensator according to the first embodiment of the present invention.

FIG. 7 is a circuit configuration diagram illustrating the common voltage compensator according to the first exemplary embodiment of the present invention.

As shown in FIG. 7, the first to fourth common voltage compensators VCOMC1 to VCOMC4 comprise resistors and OP amplifiers. The first common voltage compensator VCOMC1 comprises an 11th resistor R11, a 12th resistor R12, and a first OP amplifier OP1. The second common voltage compensator VCOMC2 comprises a 21th resistor R21, a 22th resistor R22, and a second OP amplifier OP2. The third common voltage compensator VCOMC3 comprises a 31th resistor R31, a 32th resistor R32, and a third OP amplifier OP3. The fourth common voltage compensator VCOMC4 comprises a 41th resistor R41, a 42th resistor R42, and a fourth OP amplifier OP4.

The relation of connection between the 11th and 12th resistors R11 and R12 and first OP amplifier OP1 included in the first common voltage compensator VCOMC1 is as follows. One end of the 11th resistor R11 is connected to a common voltage line from which a feedback common voltage is received, and the other end is connected to an inverting terminal (−) of the first OP amplifier OP1. One end of the 12th resistor R12 is connected to the inverting terminal (−) of the first OP amplifier OP1, and the other end is connected to an output terminal of the first OP amplifier OP1 through which a compensated common voltage is output.

The relation of connection between the 21th and 22th resistors R21 and R22 and second OP amplifier OP2 included in the second common voltage compensator VCOMC2 is as follows. One end of the 21th resistor R21 is connected to a common voltage line from which a feedback common voltage is received, and the other end is connected to an inverting terminal (−) of the second OP amplifier OP2. One end of the 22th resistor R22 is connected to the inverting terminal (−) of the second OP amplifier OP2, and the other end is connected to an output terminal of the second OP amplifier OP2 through which a compensated common voltage is output.

The relation of connection between the 31th and 32th resistors R31 and R32 and third OP amplifier OP3 included in the third common voltage compensator VCOMC3 is as follows. One end of the 31th resistor R31 is connected to a common voltage line from which a feedback common voltage is received, and the other end is connected to an inverting terminal (−) of the third OP amplifier OP3. One end of the 32th resistor R32 is connected to the inverting terminal (−) of the third OP amplifier OP3, and the other end is connected to an output terminal of the third OP amplifier OP3 through which a compensated common voltage is output.

The relation of connection between the 41th and 42th resistors R41 and R42 and fourth OP amplifier OP4 included in the fourth common voltage compensator VCOMC4 is as follows. One end of the 41th resistor R41 is connected to a common voltage line from which a feedback common voltage is received, and the other end is connected to an inverting terminal (−) of the fourth OP amplifier OP4. One end of the 42th resistor R42 is connected to the inverting terminal (−) of the fourth OP amplifier OP4, and the other end is connected to an output terminal of the fourth OP amplifier OP4 through which a compensated common voltage is output.

The first to fourth common voltage compensators VCOMC1 to VCOMC4 output compensated common voltages by applying the same compensation value or different compensation values depending on the resistance ratio between resistors (e.g., R11 and R12). That is, compensated common voltages vcomc1 to vcom4 may be the same or differ depending on the resistance values of the resistors of the first to fourth common voltage compensators VCOMC1 to VCOMC4. Normally, the first common voltage compensator VCOMC1 and the third common voltage compensator VCOMC3 may output compensated common voltages vcomc1 and vcomc3 by applying the same compensation value. However, the compensated common voltages vcomc1 to vcomc4 output from the first to fourth common voltage compensators VCOMC1 to VCOMC4 may differ from each other since the ratio of the line resistances of the left and right common voltage lines cannot be 1:1. Accordingly, the resistance values of the resistors comprising the first to fourth common voltage compensators VCOMC1 to VCOMC4 are determined by a liquid crystal panel measurement process in the design and engineering phases, before shipment. Meanwhile, a common voltage output from the common voltage generator may be supplied to non-inverting terminals (+) of the first to fourth OP amplifiers OP1 to OP4.

The first exemplary embodiment of the present invention is based on the premise that all of the first to fourth common voltage compensators VCOMC1 to VCOMC4 are used. For a liquid crystal panel, however, the amount of ripple in the common voltage across the liquid crystal panel may be small or large depending on deviations occurring during manufacture. In this case, design margin can be achieved during the engineering phase by installing a dummy resistor RL at output terminals of the first and second common voltage compensators VCOMC1 and VCOMC2 and a dummy resistor RR at output terminals of the third and fourth common voltage compensators VCOMC3 and VCOMC4. For example, if the resistance value of the first dummy resistor RL is low (below MΩ), the compensated common voltages vcomc1 and vcomc2 output from the output terminals of the first and second common voltage compensators VCOMC1 and VCOMC2 are similar in the amount of compensation. On the contrary, if the resistance value of the first dummy resistor RL is high (above MΩ), the compensated common voltages vcomc1 and vcomc2 output from the output terminals of the first and second common voltage compensators VCOMC1 and VCOMC2 differ in the amount of compensation. The same applies to the third and fourth common voltage compensators VCOM3 and VCOMC4, so a detailed description thereof will be omitted.

Figure 8:
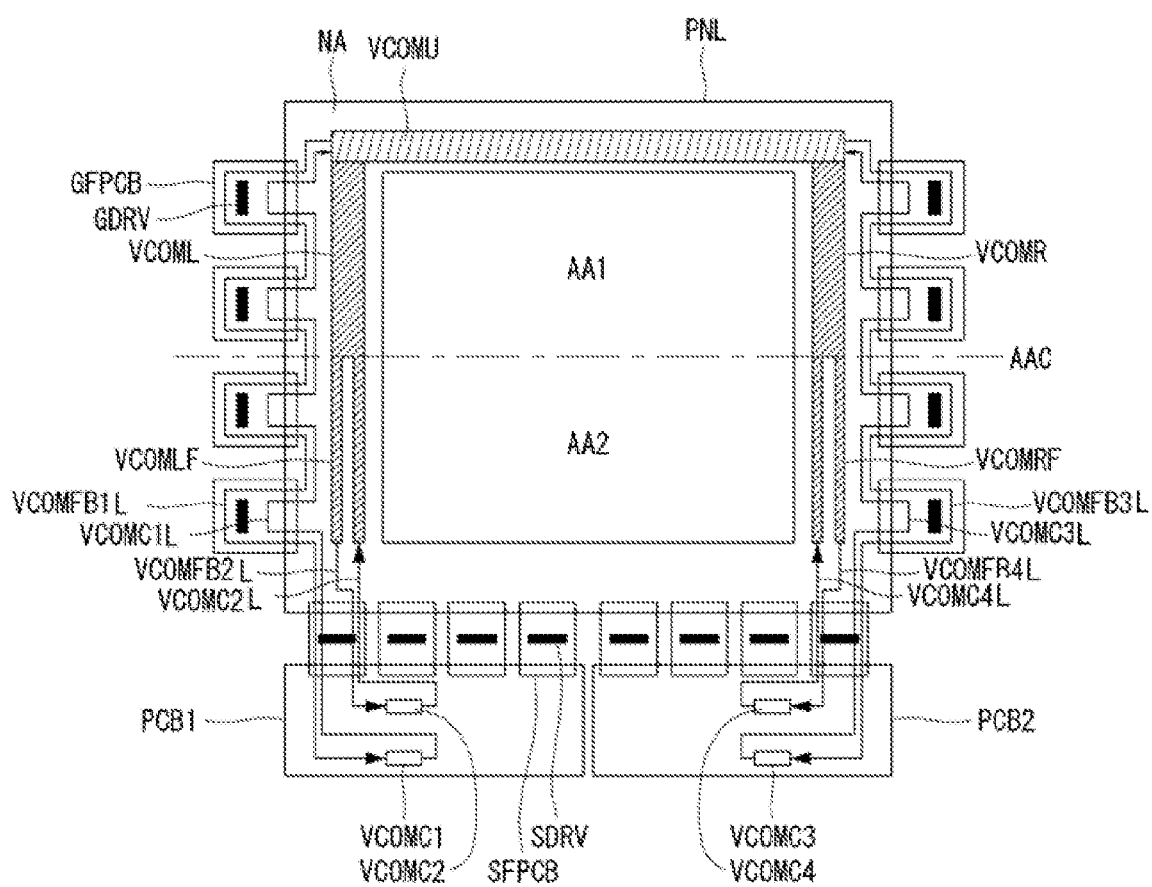
FIG. 8 illustrates the application of common voltage compensators to a large-area liquid crystal display according to an example of the present invention.

FIG. 8 illustrates the application of common voltage compensators to a large-area liquid crystal display.

As shown in FIG. 8, the large-area liquid crystal display comprises a liquid crystal panel PNL, gate printed circuit boards (hereinafter, abbreviated as 'gate PCB') GFPCB, source printed circuit boards (hereinafter, abbreviated as 'source PCB') SFPCB, first and second printed circuit boards (hereinafter, abbreviated as 'first and second PCBs') PCB1 and PCB2, gate drivers GDRV, data drivers SDRV, and common voltage compensators VCOMC1 to VCOMC4.

One side of the gate PCB GFPCB is attached to a non-display area NA on the left and right sides of the liquid crystal panel PNL. The gate PCB GFPCB consists of a flexible circuit board. The gate driver GDRV is mounted on the gate PCB GFPCB. One side of the source PCB SFPCB is attached to the non-display area NA on the bottom of the liquid crystal panel PNL. The source PCB SFPCB consists of a flexible circuit board. The data driver SDRV is mounted on the source PCB SFPCB. The other side of the source PCB SFPCB is attached to the first and second PCBs PCB1 and PCB2. The common voltage compensators VCOMC1 to VCOMC4 are mounted on the first and second PCBs PCB1 and PCB2. A timing controller or a power supply part may be mounted on the first and second PCBs PCB 1 and PCB2.

As shown in FIG. 6, a unilateral common voltage line VCOMU, a left common voltage line VCOML, a right common voltage line VCOMR, a left dummy common voltage line VCOMLF, and a right dummy common voltage line VCOMRF are formed in the non-display area NA of the liquid crystal panel PNL.

The first common voltage compensator VCOMC1 receives a feedback common voltage through a first common voltage feedback line VCOMFB1L, and supplies a compensated common voltage through a first common voltage compensation line VCOMC1L. The first common voltage feedback line VCOMFB1L and the first common voltage compensation line VCOMC1L are wired to pass through the source PCBs SFPCB, the gate PCBs GFPCB, and the non-display area NA on the left side of the liquid crystal panel PNL. Likewise, the third common voltage feedback line VCOMFB3L and third common voltage compensation line VCOMC3L of the third common voltage compensator VCOMC3 are wired to pass through the source PCBs SFPCB, the gate PCBs GFPCB, and the non-display area NA on the right side of the liquid crystal panel PNL.

The second common voltage compensator VCOMC2 receives a feedback common voltage through a second common voltage feedback line VCOMFB2L, and supplies a compensated common voltage through a second common voltage compensation line VCOMC2L. The second common voltage feedback line VCOMFB2L and the second common voltage compensation line VCOMC2L are wired to pass through the source PCB SFPCB, the gate PCB GFPCB, and the non-display area NA on the left side of the liquid crystal panel PNL. Likewise, the fourth common voltage feedback line VCOMFB4L and fourth common voltage compensation line VCOMC4L of the fourth common voltage compensator VCOMC4 are wired to pass through the source PCB SFPCB, the gate PCB GFPCB, and the non-display area NA on the right side of the liquid crystal panel PNL.

Routing the common voltage feedback lines and the common voltage compensation lines according to the above-described structure can minimize the problem of overlap with the lines formed in the non-display area NA on the left and right sides of the liquid crystal panel PNL, thereby preventing signal distortions caused by coupling.

<Second Exemplary Embodiment>

Figure 9:
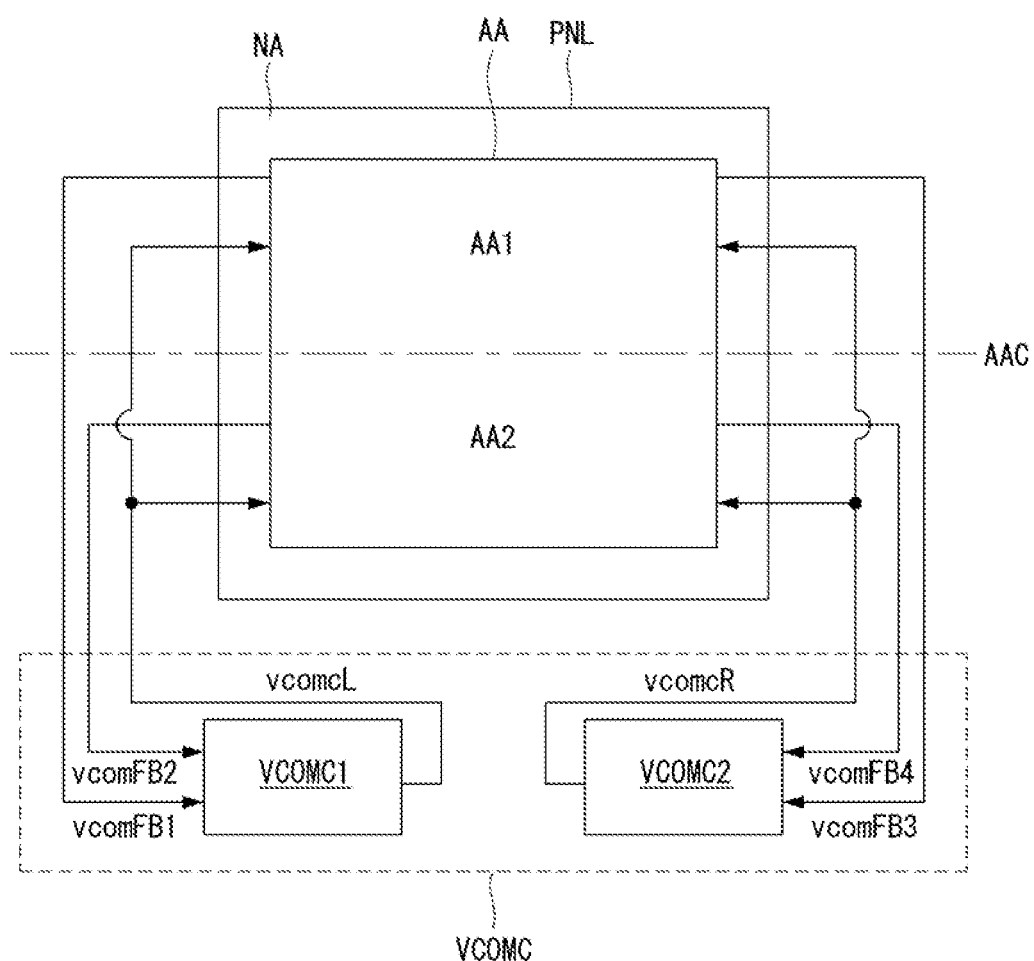
FIG. 9 is a view for explaining the concept of compensation by a common voltage compensator according to a second embodiment of the present invention.
Figure 10:
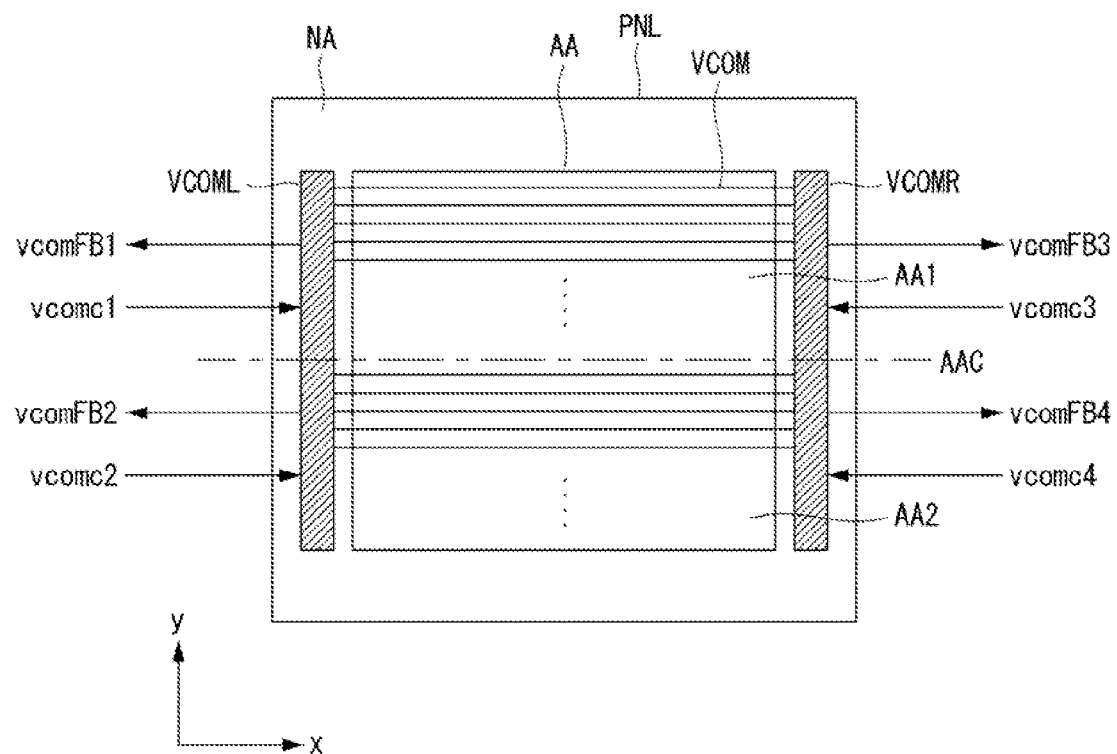
FIGS. 10 to 13 are illustrations showing a variety of patterns of common voltage lines for common voltage compensation according to examples of the present invention.
Figure 11:
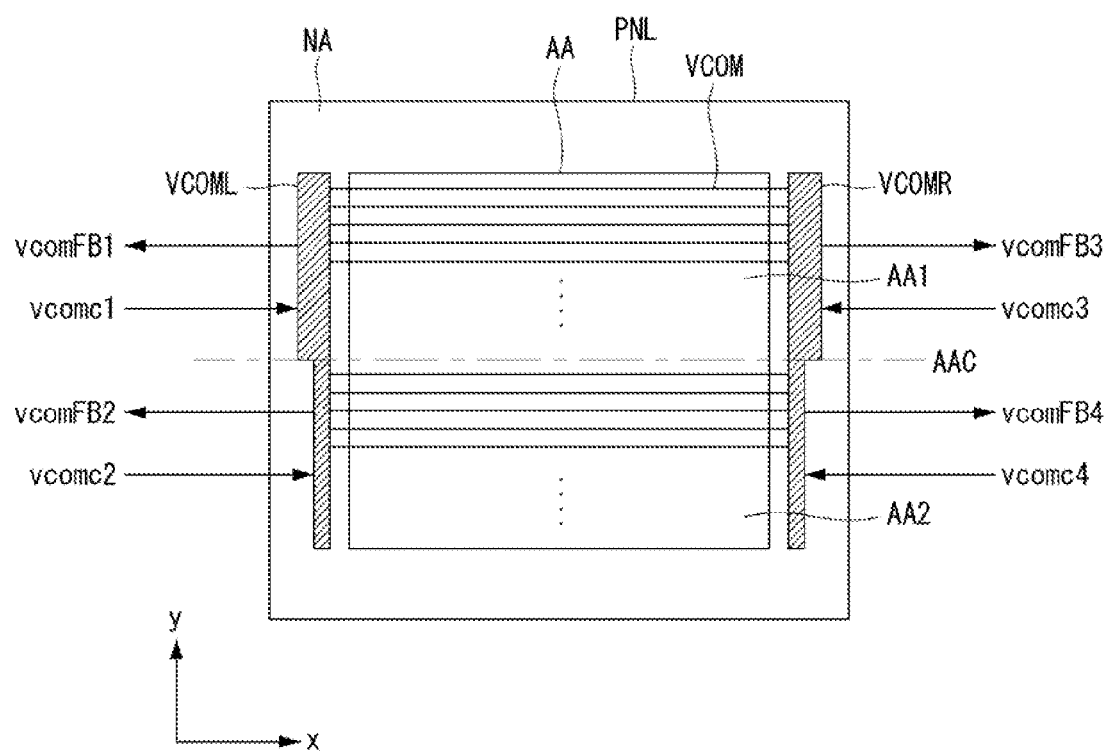
Figure 12:
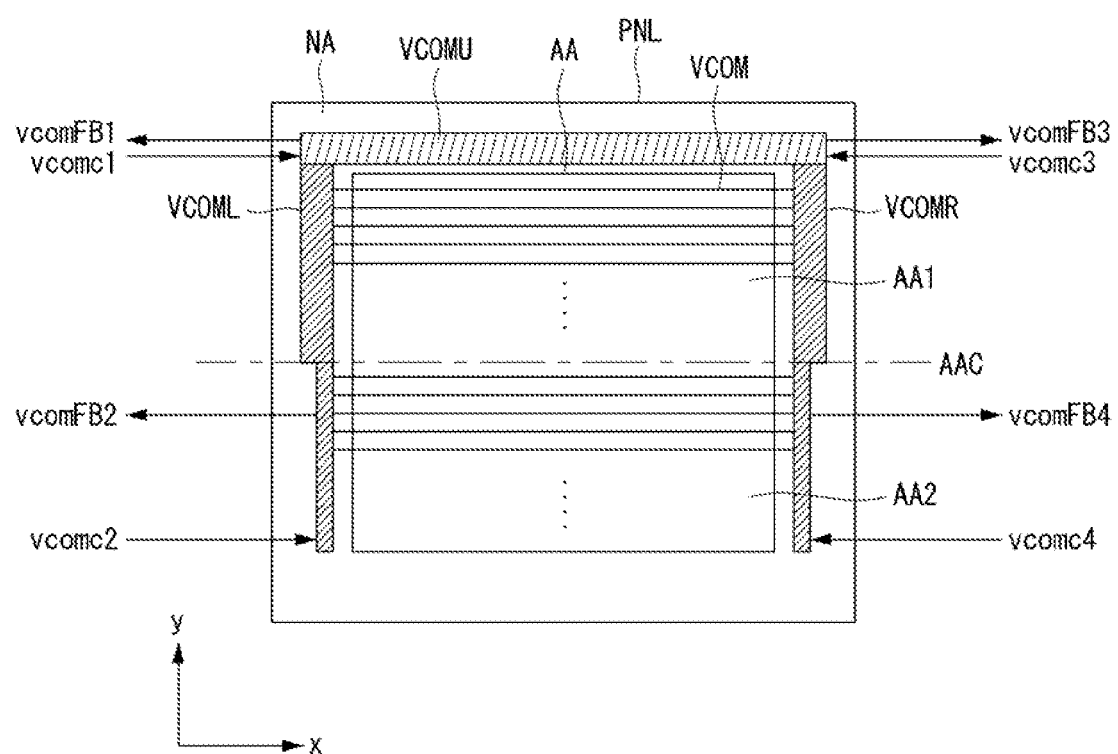
Figure 13:
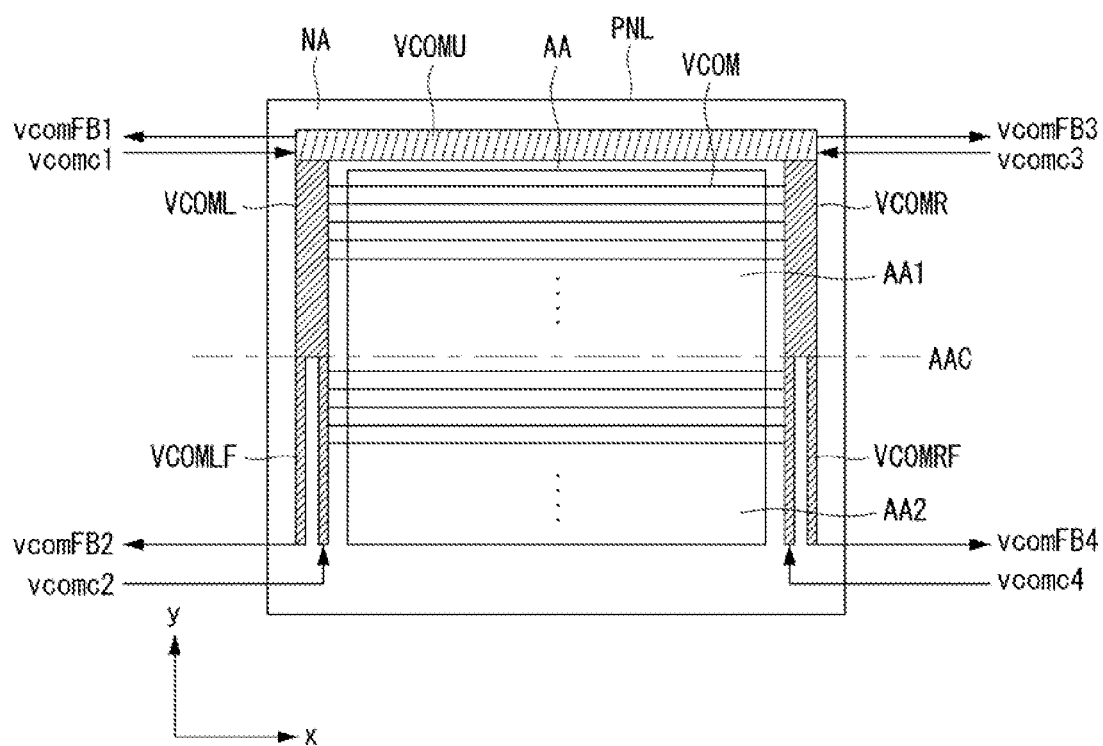

FIG. 9 is a view for explaining the concept of compensation by a common voltage compensator according to a second exemplary embodiment of the present invention. FIGS. 10 to 13 are illustrations showing a variety of patterns of common voltage lines for common voltage compensation.

As shown in FIG. 9, the common voltage compensator VCOMC according to the second exemplary embodiment of the present invention receives a feedback common voltage from the common voltage lines formed both the left and right sides of the liquid crystal panel. The common voltage compensator VCOMC outputs left and right compensated common voltages vcomcL and vcomcR based on first to fourth feedback common voltages vcomFB1 to vcomFB4. The left and right compensated common voltages vcomcL and vcomcR output from the common voltage compensator VCOMC are re-supplied to the common voltage lines formed on both the left and right sides of the liquid crystal panel PNL.

Specifically, a display area AA is divided into a first display area AA1 and a second display area AA2 with respect to the center AAC of the liquid crystal panel PNL. A first common voltage compensator VCOMC1 receives first and second feedback common voltages vcomFB1 and vcomFB2 from the left side of the first and second display areas AA1 and AA2, and supplies a left compensated common voltage vcomcL to the left side of the first and second display areas AA1 and AA2.

A second common voltage compensator VCOMC2 receives third and fourth feedback common voltages vcomFB3 and vcomFB4 from the left side of the first and second display areas AA1 and AA2, and supplies a right compensated common voltage vcomcR to the left side of the first and second display areas AA1 and AA2.

By dividing the display area AA into the first display area AA1 and the second display area AA2 with respect to the center AAC of the liquid crystal panel PNL and compensating the common voltage vcom fully considering that the amount of ripple depends on the position in the liquid crystal panel PNL, thereby enabling more uniform and accurate compensation of the common voltage vcom.

The pattern of common voltage lines is formed as shown in FIGS. 1 to 3, in order to compensate the common voltage vcom fully considering that the amount of ripple depends on the size of the liquid crystal panel PNL.

Figure 14:
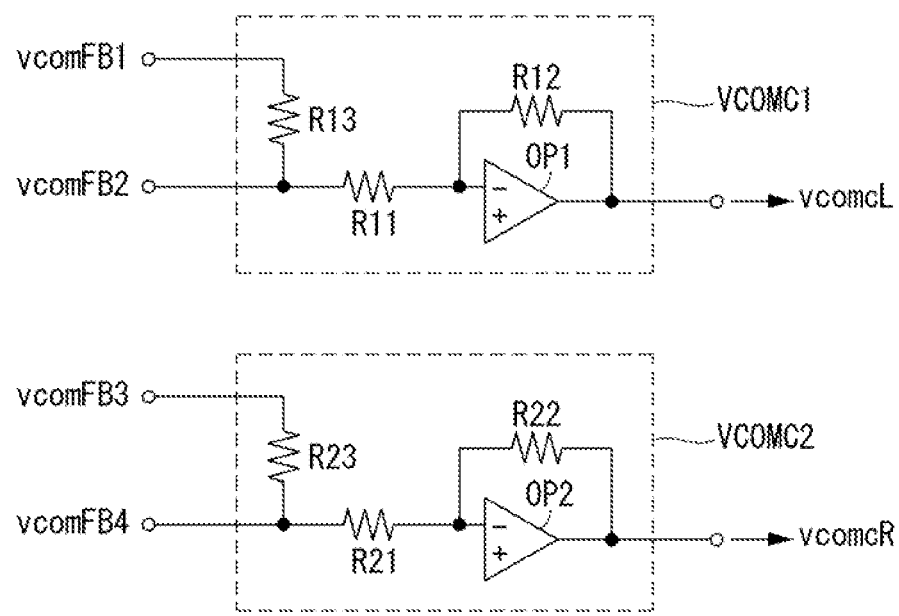
FIG. 14 is a circuit configuration diagram illustrating the common voltage compensator according to the second embodiment of the present invention.
Figure 15:
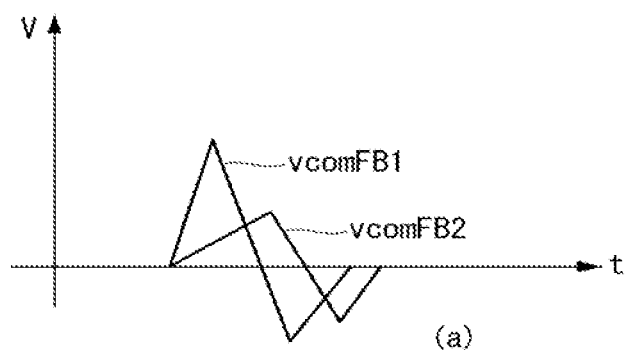
FIG. 15 a waveform diagram illustrating feedback common voltages and a compensated common voltage according to an example of the present invention.
Figure 15:
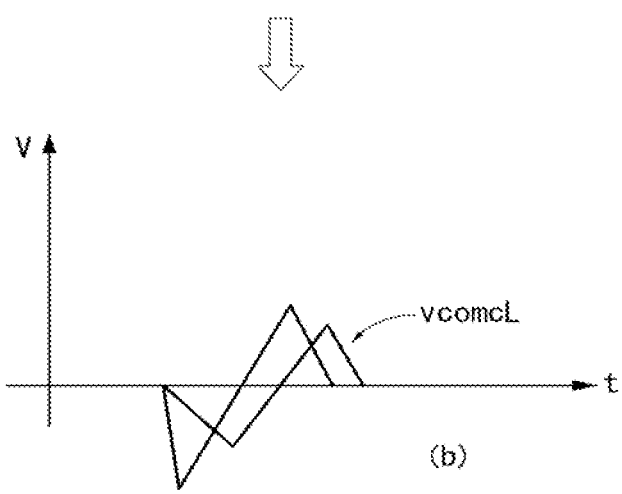

FIG. 14 is a circuit configuration diagram illustrating the common voltage compensator according to the second exemplary embodiment of the present invention. FIG. 15 a waveform diagram illustrating feedback common voltages and a compensated common voltage.

As shown in FIGS. 9 to 14, the first and second common voltage compensators VCOMC1 and VCOMC2 comprise resistors and OP amplifiers. The first common voltage compensator VCOMC1 comprises an 11th resistor R11, a 12th resistor R12, a 13th resistor R13, and a first OP amplifier OP1. The second common voltage compensator VCOMC2 comprises a 21th resistor R21, a 22th resistor R22, a 23th resistor R23, and a second OP amplifier OP2.

The relation of connection between the 11th, 12th, and 13th resistors R11, R12, and R13 and first OP amplifier OP1 included in the first common voltage compensator VCOMC1 is as follows. One end of the 11th resistor R11 is connected to a common voltage line from which a feedback common voltage is received, and the other end is connected to an inverting terminal (−) of the first OP amplifier OP1. One end of the 12th resistor R12 is connected to the inverting terminal (−) of the first OP amplifier OP1, and the other end is connected to an output terminal of the first OP amplifier OP1 through which a compensated common voltage is output. One end of the 13th resistor R13 is connected to a common voltage line from which a feedback common voltage is received, and the other end is connected to one end of the 11th resistor R11. The first common voltage compensator VCOMC1 outputs a left compensated common voltage vcomcL based on the sum of the first and second feedback common voltages vcomFB1 and vcomFB2.

The relation of connection between the 21th, 22th, and 23th resistors R21, R22, and R23 and second OP amplifier OP2 included in the second common voltage compensator VCOMC2 is as follows. One end of the 21th resistor R21 is connected to a common voltage line from which a feedback common voltage is received, and the other end is connected to an inverting terminal (−) of the second OP amplifier OP2. One end of the 22th resistor R22 is connected to the inverting terminal (−) of the second OP amplifier OP2, and the other end is connected to an output terminal of the second OP amplifier OP2 through which a compensated common voltage is output. One end of the 23th resistor R23 is connected to a common voltage line from which a feedback common voltage is received, and the other end is connected to one end of the 21th resistor R21. The second common voltage compensator VCOMC2 outputs a right compensated common voltage vcomcR based on the sum of the third and fourth feedback common voltages vcomFB3 and vcomFB4.

For instance, when the first and second common voltages vcomFB1 and vcomFB2 are supplied, the first common voltage compensator VCOMC1 inversely compensates the first and second feedback common voltages vcomFB1 and vcomFB2 to output the left common voltage vcomL. Likewise, the second common voltage compensator VCOMC2 has the compensation characteristic shown in FIG. 15. Meanwhile, the common voltage output from the common voltage generator may be supplied to the non-inverting terminals (+) of the first and second OP amplifiers OP1 and OP2.

As explained above, the first and second exemplary embodiments of the present invention employ a structure which is capable of dividing a common voltage line path VCOM PATH within a liquid crystal panel into two, receiving a feedback common voltage from the left and right sides of a display area by using COF (chip on film) and LOG (line on glass), and transferring a compensated common voltage, in order to figure out and compensate for the amount of ripple in the common voltage of the liquid crystal panel. Also, the first and second exemplary embodiments of the present invention employ different compensation structures for different areas in which different feedback common voltages are received from the left and right sides of the display area and different compensated common voltages are supplied.

As seen from above, the present invention provides a liquid crystal display which minimizes signal distortions caused by line resistance and coupling and brings about picture quality problems such as horizontal crosstalk by enabling optimal compensation design suited to the characteristics of ripple in the common voltage within the liquid crystal panel

What is claimed is:

1. A liquid crystal display comprising:
   a liquid crystal panel comprising a display area and a non-display area;
   left and right common voltage lines connected to common voltage lines formed in the display area and located in the non-display area on the left and right sides of the display area; and
   a common voltage compensator that receives feedback common voltages from the left and right common voltage lines and outputs compensated common voltages based on the feedback common voltages, wherein the common voltage compensator divides the display area into a first display area and a second display area with respect to the center of the liquid crystal panel and performs different compensation to the first display area and the second display area, wherein the left and right common voltage lines formed in the non-display area on the left and right sides of the first display area are wider than the left and right common voltage lines formed in the non-display area on the left and right sides of the second display area, and wherein the left and right common voltage lines formed in the non-display area on the left and right sides of the second display area comprise dummy common voltage lines which are physically separated from the left and right common voltage lines in the non-display area on the left and right sides of the second display area.

2. The liquid crystal display of claim 1, wherein the common voltage lines located in the non-display area on the left and right sides of the display area are electrically connected by a unilateral common voltage line located in the non-display area on one side of the display area.

3. The liquid crystal display of claim 1, wherein the common voltage compensator comprises first to fourth common voltage compensators, the first common voltage compensator receiving a first feedback common voltage from the unilateral common voltage line formed in the non-display area on the left side of the first display area and supplying a first compensated common voltage to the unilateral common voltage line formed in the non-display area on the left side of the first display area, the second common voltage compensator receiving a second feedback common voltage from the left dummy common voltage line formed in the non-display area on the left side of the second display area and supplying a second compensated common voltage to the left common voltage line formed in the non-display area on the left side of the second display area, the third common voltage compensator receiving a third feedback common voltage from the unilateral common voltage line formed in the non-display area on the right side of the first display area and supplying a third compensated common voltage to the unilateral common voltage line formed in the non-display area on the right side of the first display area, and the fourth common voltage compensator receiving a fourth feedback common voltage from the right dummy common voltage line formed in the non-display area on the right side of the second display area and supplying a fourth compensated common voltage to the right common voltage line formed in the non-display area on the right side of the second display area.

4. The liquid crystal display of claim 1, wherein the common voltage compensator comprises:
    first to fourth common voltage compensators each comprising resistors and an OP amplifier;
    a first dummy resistor for electrically connecting an output terminal of the first common voltage compensator and an output terminal of the second common voltage compensator; and
    a second dummy resistor for electrically connecting an output terminal of the third common voltage compensator and an output terminal of the fourth common voltage compensator.

5. The liquid crystal display of claim 4, wherein the first to fourth common voltage compensators receive feedback common voltages through common voltage feedback lines, and supply compensated common voltages through common voltage compensation lines, and
    the first and third common voltage feedback lines and the first and third common voltage compensation lines are wired to pass through source printed circuit boards each having a data driver mounted thereon, gate printed circuit boards each having a gate driver mounted thereon, and the non-display area on the left and right sides of the liquid crystal panel.

* * * * *